No. 867,169. PATENTED SEPT. 24, 1907.
W. THOMAS.
SPLIT SLEEVE.
APPLICATION FILED AUG. 11, 1906.
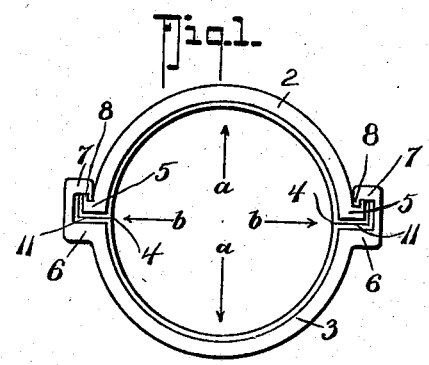
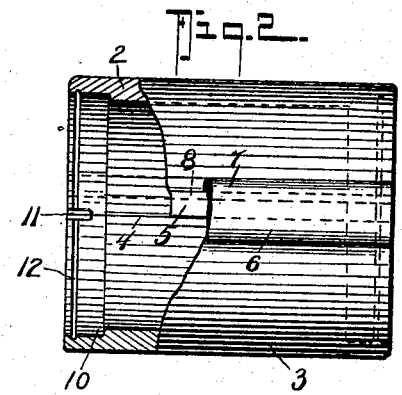
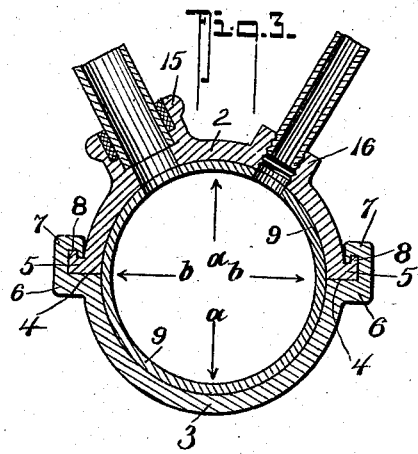
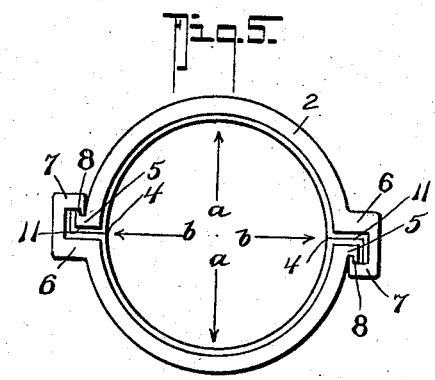
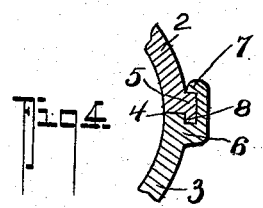
WITNESSES:
F. C. Gibson.
H. Woodard
INVENTOR
Walter Thomas.
BY
Fred G. Dieterich
ATTORNEY.

UNITED STATES PATENT OFFICE.

WALTER THOMAS, OF VANCOUVER, BRITISH COLUMBIA, CANADA.

SPLIT SLEEVE.

No. 867,169.  Specification of Letters Patent.  Patented Sept. 24, 1907.

Application filed August 11, 1906. Serial No. 330,183.

*To all whom it may concern:*

Be it known that I, WALTER THOMAS, a citizen of the Dominion of Canada, residing at the city of Vancouver, in the Province of British Columbia, Canada, have invented a new and useful Improvement in a Split Sleeve, of which the following is a specification.

This invention relates to a split sleeve designed for the purpose of repairing or for making branch pipe connections to gas or water mains.

In split sleeves of this class, as generally made, although ample means is provided to resist the separation of the two halves of the sleeve in directions normal to the plane of the joint, no efficient resistance is offered to those pressures the resultants of which act in the plane of the joint, that is which tend to open or spread the semi-cylindrical halves of the sleeve. As the fluid pressure in the case of a water pipe may be considerable, and is supplemented by the bursting pressure due to the calking of the ends of the sleeve with lead or other material, this fault in split sleeves of ordinary construction prevents a satisfactory joint being made. I have remedied this defect in the sleeve which is the subject of this application by slidably interlocking together the joint edges of the two halves in a manner that will effectually resist the resultants of the bursting pressures whether normal to or in the plane of the joint.

The invention is fully described in the following specification, reference being made to the drawings by which it is accompanied, in which, Figure 1, is an end elevation of a plain split sleeve such as would be used in repairing a burst or injured pipe, Fig. 2, a side elevation and part section of the same, Fig. 3, a cross section of a sleeve showing one half having pipe connections, and, Fig. 4, a cross section of an alternative form of joint. Fig. 5, is a view similar to Fig. 1 of a slightly modified form of my invention.

In these drawings 2 and 3 represent the two halves of the sleeve jointed together at 4 in a plane through the axis of the cylindrical part of the sleeve. These halves are provided with flanges 5 and 6, the flange 6 being carried round the flange 5 to engage at 7 the back of it opposite to the face 4 of the joint. By this means the necessary resistance is provided to the resultants of the bursting strain which act normal to the plane of the joint, as represented by the arrows *a*.

Along the back edge of the flange 5 as shown in Figs. 1, 2 and 3 is a lip or bead 8 designed to slidably fit into a corresponding groove in that portion 7 of the flange 6. The flanges and the bead and groove are parallel to the axis of the cylindrical portion of the sleeve and these portions are endwise slidable on one another.

In the alternative shown in Fig. 4, the lip 8 may be formed on the joint face of 5, and the groove therefor be provided in the joint face of 6. This lip 8 in engagement with its groove will hold the lower half 6 of the sleeve against the tendency to spread in the direction of the arrows *b*, while the same tendency on the upper half 5 will be checked by the enveloping part 7 of the lower flange 6.

Where the sleeve is intended to enable pipe connections to be made to an existing main, one part of the sleeve may, as shown in Fig. 3 be furnished with a socket 15 for the reception of a branch pipe, or if the branch pipe is of small diameter a boss 16 may be provided, which boss is drilled and tapped for the reception of the screwed end of the pipe connection the required apertures being drilled or cut in the main 9. These pipe connections may be of various sizes and kinds to suit the varied requirements of the service, and a number of connections may be made to one sleeve if such are required, as the strength of the main 9 is amply reinforced by that of the sleeve itself to compensate for the reduction in the strength of the main 9 which the cutting of several apertures therethrough will cause.

The bore of the complete sleeve at each end is provided with a counterbore 10 to receive the calking material such as lead by which the joint is rendered tight, and this counter-bore 10 may have an annular groove 12 into which the material will expand when calked to retain it in the counter-bore, and to prevent any leakage which may pass through the longitudinal joint 4 from escaping at the ends of the joint a calking recess 11 may be provided to the bead 8.

A split sleeve is thus provided which can be readily applied for the repair of a burst or injured pipe, in which case the plain sleeve illustrated in Figs. 1 and 2 would be used; or if branch connections are required to be made to an existing main a half sleeve 5 would be selected or made having the necessary socket or sockets for the required branch or branches.

One-half sleeve is applied to the pipe and the interlocking flanges of the other half being entered at one end it is slid endwise into position to correspond. The ends 15 and 16 are then calked with lead and the repair is effected. Or if pipe connections are to be made the necessary holes are cut through the pipe 9 after the sleeve is secured in the desired position.

I am aware that prior to my invention boltless split sleeves have been used having interlocking joints designed to secure the two halves against separation by pressure normal to the joint face, and that others have been used and patented having dove-tailed wedges designed to embrace the flanges to secure such halves together, but such securing wedges have been separate parts and the dove-tailing has only been to retain the wedge on the lips of the flange, and do not satisfactorily oppose the spreading tendency, which my sleeve has been specifically designed to meet.

Having now particularly described my invention and the manner of its application and use I hereby declare that what I claim as new and desire to be protected in by Letters Patent is:

1. A split sleeve comprising two semi-cylindrical portions, an outwardly projecting flange along the joint edges of one portion said flange having a bead parallel to the joint face and in cross section normal thereto, a similar flange along the joint edges of the other portion, said flange carried around to engage the back of the flange of the first named portion, and having a groove to slidably engage the bead of said first named portion, said semi-cylindrical portions each having counter-bores at their ends concentric with the longitudinal axis of the sleeve, said semi-cylindrical portions also having supplemental calking recesses for said bead portions thereof, substantially as shown and described.

2. A split sleeve comprising two semi-cylindrical portions, and an outwardly projecting flange along the joint edge of one portion, said flange having a bead parallel to the joint face and in cross section normal thereto, a similar flange along the joint edges of the other portion, said flange carried around to engage the back of the flange of the first mentioned portion and having a groove to slidably engage the bead of the first named portion, said semi-cylindrical portions each having counterbores at their ends concentric with the longitudinal axis of the sleeve, said semi-cylindrical portions also having supplemental calking recesses for the bead portions thereof at the ends of each sleeve, said supplemental recesses merging with said counterbores, substantially as shown and described.

3. A split sleeve comprising two semi-cylindrical portions, an outwardly projecting flange along the joint edge of one portion, said flange having a bead parallel to the joint face and in cross section normal thereto, a similar flange along the joint edges of the other portion, said flange carried around to engage the back of the first mentioned portion and having a groove to slidably engage the bead of the first named portion, said semi-cylindrical portions each having counterbores at their ends concentric with the longitudinal axis of the sleeve, said semi-cylindrical portions also having supplemental calking recesses for the bead portions thereof at the ends of each sleeve, said supplemental recesses commencing at the counterbores and extending radially therefrom and terminating in right angled portions, substantially as shown and for the purposes described.

4. A split sleeve, comprising two semi-cylindrical portions, an outwardly projecting flange along the joint edge of one portion, said flange having a bead parallel to the joint face and in cross section normal thereto, a similar flange along the joint edges of the other portion, said flange carried around to engage the back of the flange of the first mentioned portion and having a groove to slidably engage the bead of the first named portion, said semi-cylindrical portions each having counterbores at their ends concentric with the longitudinal axis of the sleeve, said semi-cylindrical portions also having supplemental calking recesses for the bead portions thereof at the ends of each sleeve, said supplemental recesses commencing at the counterbore and extending radially therefrom and terminating in right angled portions, said supplemental recesses being of less depth than the counterbores, substantially as shown and described.

In testimony whereof I have signed my name to this specification in the presence of two subscribing witnesses.

WALTER THOMAS.

Witnesses:
ROWLAND BRITTAIN,
MARY BANBURRY.